United States Patent [19]

Day

[11] 3,949,289

[45] Apr. 6, 1976

[54] DUAL BATTERY IGNITION AND START SYSTEM FOR A VEHICLE

[76] Inventor: Oliver E. Day, 13601 Woodend Road, R.R. 1, Box 414, Bonner Springs, Kans. 66012

[22] Filed: July 25, 1974

[21] Appl. No.: 491,959

[52] U.S. Cl. .................... 320/6; 320/15; 320/61; 307/10 BP
[51] Int. Cl.² .................................. H02J 7/14
[58] Field of Search ............ 320/6, 7, 5, 15, 61, 16; 317/9 BP; 307/10 B, 10 R

[56] References Cited
UNITED STATES PATENTS

| | | | |
|---|---|---|---|
| 1,898,370 | 2/1933 | Hughes et al. | 320/6 X |
| 3,457,491 | 7/1969 | Black et al. | 320/61 X |
| 3,763,415 | 10/1973 | Ownby | 320/6 |

*Primary Examiner*—J. D. Miller
*Assistant Examiner*—Robert J. Hickey
*Attorney, Agent, or Firm*—Spencer & Kaye

[57] ABSTRACT

A circuit arrangement for a vehicle or the like which permits either the vehicle battery or the battery of a camper connected to the vehicle to be selectively used for the ignition voltage of the vehicle engine and which permits either the vehicle battery or the camper battery, or both of these batteries connected in parallel to be used for the starter motor of the vehicle engine. The conventional electrical system of the vehicle is modified in that a single pole double throw switch is provided for selectively connecting the battery voltage input terminal of the vehicle ignition switch to either the vehicle battery or to the camper battery; a switch is provided in the line connecting the starter control voltage output terminal of the ignition switch to the control input of the vehicle starter relay; a further starter relay is provided for connecting the camper battery to the starter motor; and a further switch is provided for connecting the starter control voltage output terminal of the ignition switch to the control input of the further starter relay.

3 Claims, 1 Drawing Figure

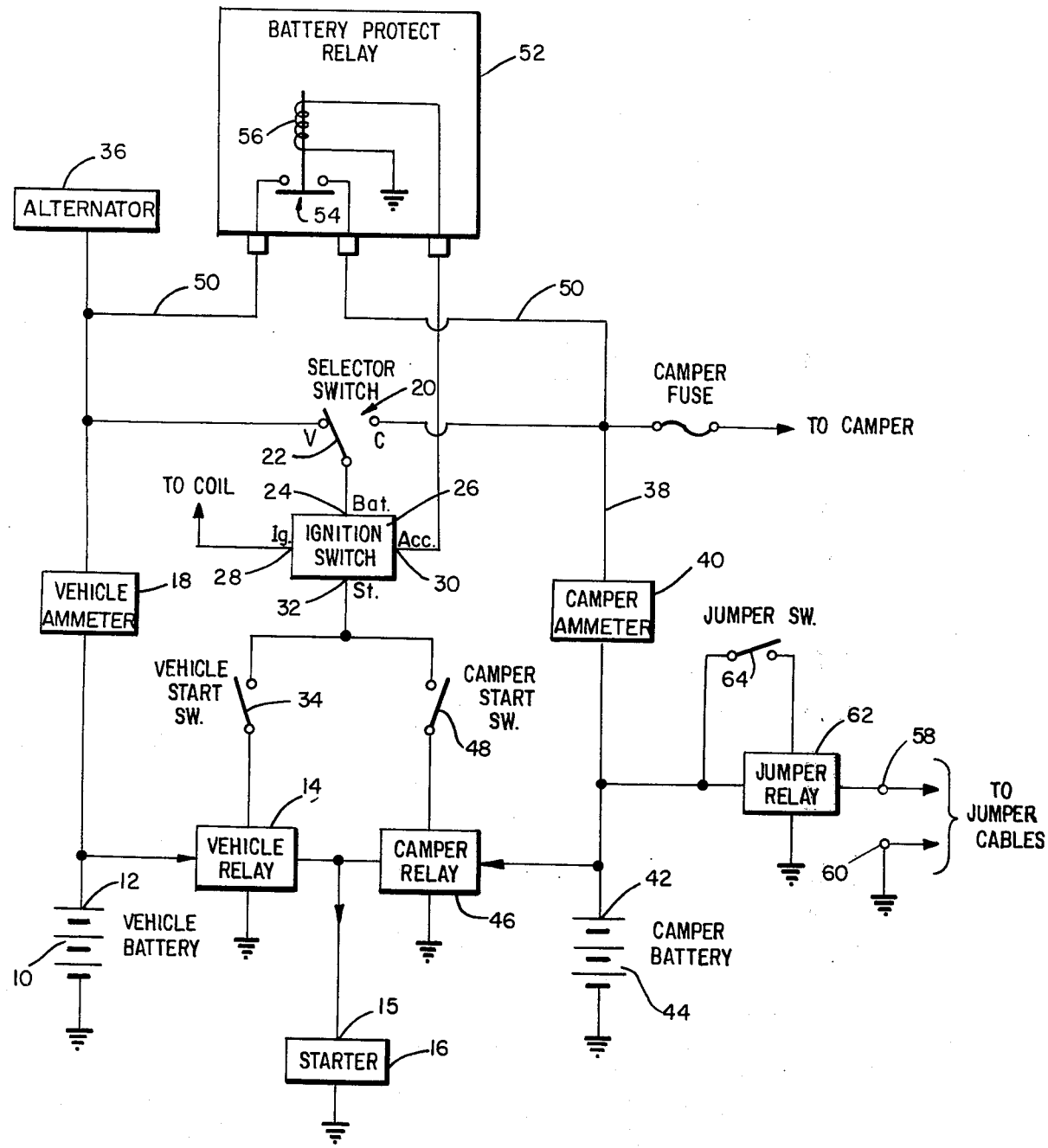

DUAL BATTERY IGNITION AND START SYSTEM FOR A VEHICLE

BACKGROUND OF THE INVENTION

The present invention relates to a dual battery ignition and start system for a conventional motor driven vehicle. More particularly, the present invention is directed to such a system which is particularly directed to a vehicle having a camper with a separate battery connected thereto.

In the event of a stalled or disabled vehicle as a result of the vehicle battery being discharged, it is of course well known that the vehicle can be started by simply connecting a booster or auxiliary battery across the vehicle battery terminals, if such a booster battery is available. In the case where a camper having a separate battery for its electrical system is connected to the vehicle, such an additional battery is obviously available and can thus be connected to the vehicle battery in the case of an emergency by means of jumper cables so as to start the vehicle. The use of jumper cables, however, has the disadvantage that once the vehicle engine is started, and it is desired to move the vehicle, the jumper cables must normally be disconnected. In such case, if the vehicle battery was simply discharged, presumably it will be subsequently recharged by the vehicle alternator, in which case no problem will occur. However, should the vehicle battery be defective, and thus not take a charge, or should the vehicle again stall before the battery is sufficiently charged, the jumper cables must then be reconnected in order to start the vehicle which is obviously annoying.

SUMMARY OF THE INVENTION

It is therefore a primary object of the present invention to provide a simple circuit arrangement for a vehicle having a trailer or a camper with a separate battery connected thereto whereby either or both of the batteries may be selectively used to start the vehicle engine and whereby either of the batteries may separately be selected to provide the ignition voltage for the vehicle engine.

The above object is achieved according to the invention by simple modification of a conventional vehicle ignition and starting control system including a vehicle battery having one terminal connected to ground, a starter motor having one terminal connected to ground and its other terminal connected via the controlled current path of a vehicle starter relay or solenoid to the other terminal of the vehicle battery, and a conventional vehicle ignition switch having a battery voltage input terminal connected to the other terminal of the vehicle battery, an ignition voltage output terminal connected to the ignition coil and a starter control voltage output terminal connected to the control input of the vehicle starter relay. According to the invention, the above circuit is modified in that a switch is provided in the line connecting the starter control voltage output terminal of the ignition switch to the control input of the vehicle starter relay, a single pole double throw switch is provided for selectively connecting the battery voltage input terminal of the ignition switch either to the vehicle battery or to the camper battery, a further starter relay is provided for connecting the starter to the camper battery, and a switch is provided for connecting the starter control voltage output terminal of the ignition switch to the control input of the further starter relay. In this manner, the position of the double pole single throw switch will determine which of the two batteries provides the ignition voltage for the vehicle and the closing of one or both of the switches connected to the starter relays will determine which one or whether both of the batteries will supply the starting voltage for the starter motor.

According to a further feature of the invention, if both batteries are to be charged by the vehicle alternator, the current path between the alternator and the camper battery is provided with a battery protect relay which will disconnect the camper battery from the alternator during the starting process in order to prevent current surges from traveling between the two electrical systems, and possibly damaging same. This battery protect relay according to the invention is responsive to the output voltage on the accessory output terminal of the vehicle ignition switch, which as is conventional is disconnected from the battery during the starting operation.

BRIEF DESCRIPTION OF THE DRAWING

The FIGURE is a circuit diagram of the preferred embodiment of the dual ignition and start system for a vehicle having a camper connected thereto according to the invention.

DESCRIPTION OF THE PREFERRED EMBODIMENT

Referring now the FIGURE, there is shown a vehicle battery 10 having one terminal thereof connected to the circuit common line which is indicated in the FIGURE as ground. As is conventional in starting systems from motor vehicles, the other terminal 12 of the vehicle battery 10 is connected via the controlled current path of a vehicle starter relay or solenoid 14, i.e. the current path containing the relay contacts, to one terminal 15 of a starter motor 16 whose other terminal is connected to ground. The terminal 12 of the vehicle battery 10 is also connected via the vehicle current indicating device, the vehicle ammeter 18 as illustrated, to one terminal V of a single pole double throw selector switch 20 whose movable contact 22 is connected to the battery voltage input terminal 24 of a conventional automobile ignition switch 26. As is conventional, the ignition switch likewise has an ignition voltage output terminal 28 which is connected to the ignition coil, an accessory voltage output terminal 30 and a starter control voltage output terminal 32. As is well known and conventional with such ignition switches, switching of the switch 26 into its on position connects the terminal 24 to the terminals 28 and 30, while switching thereof to the start position connects the terminal 24 to the terminals 28 and 32 while disconnecting the terminal 24 from the terminal 30. The starter control voltage output terminal 32 is connected via a vehicle start switch 34 to the control input of the vehicle starter relay 14, i.e. the terminal to which is connected the relay coil.

In order to charge the battery 10 during operation of the vehicle, the output of the vehicle alternator 36 is connected to the battery terminal 12 via the ammeter 18. The system thus far as described, with the exception of the presence of switches 20 and 34, is a conventional starting and ignition system.

In order to be able to simply and inexpensively connect an auxiliary battery, in particular the battery of a camper or trailer, into the above-described conventional starting and ignition system, the second terminal C of the selector switch 20 is connected via a line 38 which includes the camper occurrence indicator or ammeter 40, if such is present, to one terminal 42 of the camper battery 44. As illustrated, the terminal 42 has the same polarity as the terminal 12 of the vehicle battery 10. As with the vehicle battery 10, the other terminal of the camper battery 44 is connected to a common line or ground. The terminal 42 of the camper battery 44 is likewise connected via the control turn path of a further starter relay or solenoid 46 to the terminal 15 of the starter motor 16. The control input of the starter relay 46 is, like that of starter relay 14, connected via a switch 48 to the starter control voltage output terminal 32 of the ignition switch 26.

With the circuit thus far described, if the vehicle is to be started in the conventional manner, i.e. the battery 10 is to be used both for the ignition voltage and for the starter motor voltage, the movable contact 22 of selector switch 20 is connected to the terminal V as illustrated and the vehicle start switch 34 is closed. With this arrangement, when the ignition switch 26 is turned to the start position, the starting relay 14 will be energized to permit current to flow from the battery terminal 12 to the starter terminal 15 to energize the starter 16, and the ignition voltage appearing at the terminal 28 as well as the starter relay control voltage appearing at the terminal 32 will likewise be derived from the battery 10. Alternatively, if it becomes necessary or desirable to utilize only the camper battery 44 for the starting and ignition of the vehicle, then the movable contact 22 of the switch 20 is simply moved so that it contacts the contact C, the vehicle start switch 34 which is open and the camper start switch 48 is closed. With this arrangement, upon a starting operation the starter relay 46 will be energized to provide the starting voltage for the starter 16.

The switching arrangement shown in the FIGURE provides the additional advantage that if, for example as the result of extremely cold weather, it is necessary to utilize both batteries 10 and 44 to start the vehicle, both switches 34 and 48 are closed and the selector switch 20 may be in either of two positions. The switching arrangement according to the invention provides the further possibility of providing the starter voltage from one of the batteries while providing the ignition and control voltage for the respective starter relays from the other battery. As can easily be appreciated, the switching arrangement according to the invention can thus provide a great deal of versatility with respect to the particular battery to be used for either the ignition voltage or the starter voltage.

Since it is desirable to maintain the camper battery 44 fully charged if possible, according to the invention the output of the alternator 36 is additionally connected via a line 50, line 38 and the camper ammeter 40 to the terminal 42 of the camper battery 44. However, in order to prevent large surge currents from travelling between the two batteries, particularly during starting operations, which surge currents would tend to damage the ammeters and other circuitry connected thereto, a battery protect relay 52 is provided which has its contacts 54 connected in the line 50. The relay coil 56 of the relay 52 is connected between ground and the accessory voltage output terminal 30 of the ignition switch 26. As a result of this connection, the relay coil 56 will be energized, and the contacts 54 closed so as to complete the connection through the line 50 whenever the ignition switch 26 is in its on position. However, when the ignition switch is moved to its start position, as is conventional with such ignition switches, the battery voltage at terminal 24 is disconnected from the accessory voltage output terminal 30, and consequently the relay 54 will be momentarily deenergized, thus disconnecting the battery 44 from the output of the alternator 36.

In order to permit the connection of still a further battery to the system in an easy manner in the event both of the batteries 10 and 44 are incapable of starting the vehicle, or if for some reason an additional booster voltage is required, according to a further feature of the invention a pair of terminals 58, 60 are provided to which a pair of jumper cables (not shown) which are connected to a further battery (also not shown) may be connected. The terminal 58, which is to be connected to the terminal of the auxiliary battery having the same polarity as the terminal 42 of battery 44, is connected via the control current path of a jumper relay 62 to the terminal 42 of battery 44. The jumper relay may be energized by means of a jumper switch 64 connected between the control input of relay 62 and terminal 42 of battery 44. With the illustrated connection of the jumper switch 64, it is of course necessary that the battery 44 be able to supply sufficient voltage to energize the jumper relay 62. It is to be understood, however, that the switch 64 may equally well be connected to the terminal 12 of battery 10, the terminal 32, or even the terminal 58. The jumper switch relay 32 functions to permit a third battery to be semipermanently connected into the system, thus providing still further versatility to the circuit according to the invention.

It will be understood that the above description of the present invention is susceptible to various modifications, changes and adaptations, and the same are intended to be comprehended within the meaning and range of equivalents of the appended claims.

I claim:

1. An electrical circuit arrangement for a vehicle which permits the starting voltage and/or the ignition voltage for the vehicle engine to be derived from the vehicle battery or from an attached camper battery comprising in combination:

a vehicle battery having one terminal connected to ground; a vehicle starter relay a starter motor having one terminal connected to ground and its other terminal connected via the controlled current path of said vehicle starter relay to the other terminal of said battery; a conventional vehicle ignition switch having a battery voltage input terminal and at least an ignition voltage output terminal which is connected to the ignition coil, and a starter control voltage output terminal; a first switch connecting said starter control voltage output terminal of said ignition switch to the control terminal of said vehicle starter relay; a camper battery having one terminal connected to ground; circuit means, including the controlled current path of a further starter relay, for connecting the other terminal of said camper battery to said other terminal of said starter motor; a second switch connecting said starter control voltage terminal of said ignition switch to the control terminal of said further starter relay; and a single pole double throw switch means, having its movable contact connected to said battery voltage input terminal of said ignition switch, for selectively connecting said battery voltage input terminal to said other terminal of said vehicle battery or said other terminal of said camper battery, whereby the position of said switch means determines which of the battery supplies the voltage for the vehicle motor ignition coil and for control of said starter relays and the closure of one or both of said first and second switches determines which one or both of the batteries supplies the starter voltage.

2. A circuit arrangement as defined in claim 1 wherein said ignition switch further includes an accessory voltage output terminal which is momentarily disconnected from said ignition switch battery voltage input terminal when said ignition switch is switched to its start position; and further comprising: a vehicle alternator, first circuit means for connecting the output of said alternator to said other terminal of said vehicle battery; and second circuit means for connecting said output of said alternator to said other terminal of said camper battery, said second circuit means including relay means having its control input connected to said accessory voltage output terminal of said ignition switch and responsive to the voltage thereof, for interrupting said second circuit means when no output voltage appears at said accessory voltage output terminal of said ignition switch.

3. A circuit arrangement as defined in claim 2 further comprising: a pair of terminals by means of which jumper cables can be connected to a further battery, one of said pair of terminals being connected to ground; a jumper relay having its controlled current path connected between the other of said pair of terminals and said other terminal of said starter motor via the controlled current path of said further starter relay; and a normally open switch connected between the control input of said jumper relay and said other terminal of said camper battery.

* * * * *